US012666229B2

(12) United States Patent
Pires et al.

(10) Patent No.: US 12,666,229 B2
(45) Date of Patent: Jun. 23, 2026

(54) METHOD FOR COMMUNICATING MESSAGES BETWEEN A PLURALITY OF PIECES OF USER EQUIPMENT

(71) Applicant: BULL SAS, Les Clayes-sous-Bois (FR)

(72) Inventors: Alexis Pires, Colomiers (FR); Mathieu Badet, Toulouse (FR); Sylvain Bremec, Seysse (FR); Arnaud Sire De Vilar, Avignonet Lauragais (FR)

(73) Assignee: BULL SAS, Les Clayes-sous-Bois (FR)

( * ) Notice: Subject to any disclaimer, the term of this patent is extended or adjusted under 35 U.S.C. 154(b) by 267 days.

(21) Appl. No.: 18/420,702

(22) Filed: Jan. 23, 2024

(65) Prior Publication Data

US 2024/0259767 A1     Aug. 1, 2024

(30) Foreign Application Priority Data

Jan. 27, 2023    (EP) ..................................... 23305111

(51) Int. Cl.
*H04W 4/06* (2009.01)
*H04L 1/1829* (2023.01)
(52) U.S. Cl.
CPC ............. *H04W 4/06* (2013.01); *H04L 1/1858* (2013.01)
(58) Field of Classification Search
CPC ..... H04W 84/18; H04W 28/04; H04W 40/00; H04W 4/06; H04L 1/1858; H04L 1/1867; H04L 2001/0093
USPC ........................................................ 370/329
See application file for complete search history.

(56) References Cited

U.S. PATENT DOCUMENTS

| | | | | |
|---|---|---|---|---|
| 9,794,965 | B1 * | 10/2017 | Yu | ........................... H04L 67/12 |
| 2004/0023651 | A1 | 2/2004 | Gollnick et al. | |
| 2015/0109981 | A1 * | 4/2015 | Patil | .................. H04W 52/0212 |
| | | | | 370/336 |
| 2017/0255917 | A1 * | 9/2017 | Singh | ...................... H04W 4/06 |
| 2021/0297128 | A1 * | 9/2021 | Badic | ................... H04B 7/0617 |
| 2021/0400461 | A1 * | 12/2021 | Kalhan | ............ H04W 28/0247 |
| 2023/0318698 | A1 * | 10/2023 | Polizotto | ............ H04B 7/18513 |
| | | | | 370/316 |

FOREIGN PATENT DOCUMENTS

WO         2015139026 A2    9/2015

OTHER PUBLICATIONS

Search Report issued in EP23305111.9 dated Jul. 13, 2023 (9 pages).

* cited by examiner

*Primary Examiner* — Robert J Lopata
(74) *Attorney, Agent, or Firm* — ARC IP Law, PC; Joseph J. Mayo

(57) ABSTRACT

The invention relates to a method for communicating messages between a plurality of pieces of user equipment of a set of user equipment via a communication network. The method includes, for each receiver having determined a recipient status of a series of payload messages sent, sending to the sender by the receiver, an acknowledgment message including receive information for each payload message of the series received. In the absence of receipt of an acknowledgment message by the recipient or upon receipt of an acknowledgment message that does not include receive information for each payload message of the series, and after receipt of a status message from the recipient indicating its connection to the communication network, the method includes retransmission by the sender of each payload message not received.

10 Claims, 2 Drawing Sheets

METHOD FOR COMMUNICATING MESSAGES BETWEEN A PLURALITY OF PIECES OF USER EQUIPMENT

This application claims priority to European Patent Application Number 23305111.9, filed 27 Jan. 2023, the specification of which is hereby incorporated herein by reference.

BACKGROUND OF THE INVENTION

Technical Field of the Invention

At least one embodiment of the invention relates to the field of tactical telecommunications and relates more particularly to a method for communicating messages between a plurality of pieces of user equipment.

Description of the Related Art

Wireless telecommunication networks of the tactical radio network type are networks that have several restrictions. Firstly, when discovering services, it is necessary that each user equipment part of the network is able to identify and address the other pieces of user equipment of the network. Next, these types of networks, both mobile and decentralized, involve packet losses, which can pose reliability issues. Finally, operation in point-to-point so-called "unicast" mode may not be supported by tactical radio telecommunication user equipment, which is a drawback.

Known solutions may be impossible to implement or have unsatisfactory exchange reliability.

For example, the transmission control protocol or UDP (User Datagram Protocol) has no retransmission mechanism to ensure each packet is received and to retransmit any unreceived packets, and can therefore be relatively unreliable. UDP also limits packet size to 64 kB, which may be too small in high-speed radio communication networks.

The reliable transmission control protocol or RUDP (Reliable User Datagram Protocol) implements retransmission mechanisms but can generate a lot of packet traffic because it uses a mechanism for systematically acknowledging receipt of data packets, which can significantly degrade the network's useful bandwidth. In addition, this protocol only operates in point-to-point mode.

The transport layer protocol, or QUIC (Quick UDP Internet Protocol), only operates in point-to-point (unicast) mode in its initial version, and can therefore be complex or even impossible to implement in an ad hoc wireless network. Next, QUIC can generate a large number of acknowledgements and thus packet exchanges on the network, which can significantly degrade the network's bandwidth.

The transmission control protocol (TCP) also only operates in point-to-point mode (unicast) and also uses a mechanism for systematically acknowledging receipt of data packets, which also has drawbacks.

There is therefore a need for a simple and effective solution to overcome at least some of these drawbacks.

BRIEF SUMMARY OF THE INVENTION

One of the aims of one or more embodiments of the invention is to enable simple, reliable and efficient data exchange within highly constrained networks such as tactical radio networks.

To this end, at least one embodiment of the invention is firstly a method for communicating messages between a plurality of pieces of user equipment of a user equipment set via a communication network, especially a wireless, preferably highly constrained ad hoc communication network, said method comprising the steps of:

broadcasting by each user equipment of the user equipment set a status message indicating the presence of said user equipment on the communication network, broadcasting by one, so-called "transmitter", of the pieces of user equipment of the user equipment set, a series of payload messages to at least one other piece of user equipment of the user equipment set, each payload message of said series of payload messages comprising an identifier of said payload message and at least one identifier of a so-called "recipient" user equipment, recipient of said series of payload messages, for each so-called "receiver" user equipment having received at least one payload message of the series of payload messages broadcast by the transmitter, determining from the at least one payload message received, its status of recipient or not of the series of payload messages broadcast, for each receiver having determined a status of recipient of the series of payload messages broadcast, sending by said receiver an acknowledgement message to the transmitter, said acknowledgement message comprising receipt information for each payload message of the series received by said receiver, in the absence of receipt of an acknowledgement message sent by a recipient and after receipt of a status message from said recipient indicating its presence on the communication network, rebroadcasting by the transmitter the series of payload messages, or, upon receipt of an acknowledgement message from said recipient not comprising receipt information for each payload message of the series and after receipt of a status message from said recipient indicating its presence on the communication network, rebroadcasting by the transmitter each payload message of the series for which no receipt information is comprised in the acknowledgement message received.

By way of at least one embodiment of the invention, the acknowledgment of the payload messages of a same series is carried out via a single acknowledgment message in order to reduce the number of messages exchanged and thus preserve the communication network, and rebroadcasting is only carried out if the user equipment for which the acknowledgment is not complete is still present on the network and only for the payload messages not received.

The method according to at least one embodiment of the invention thus enables both data exchanges, in particular within highly constrained networks, such as radio networks, while ensuring high reliability (low packet loss) and avoiding significantly degrading the bandwidth, thus limiting data losses.

By the terms "presence of user equipment on the communication network", it is meant that the user equipment is connected to the network so as to be able to receive messages sent by the other pieces of user equipment of the user equipment set.

In at least one embodiment of the invention, a transmitter broadcasts messages to all the other pieces of user equipment ("broadcast" mode), but in some cases, only one or some of the other pieces of user equipment may be recipients of these messages, that is, the payload they contain is intended for them. In other words, all the pieces of user equipment may receive the messages, but in some cases only some of them may be recipients.

In one or more embodiments, the receipt information for a payload message is the identifier of said payload message.

Thus, in at least one embodiment, the acknowledgement message comprises the identifier of each payload message of the series received by the receiver.

Advantageously, in one or more embodiments, the size of a payload set configured to be inserted into a payload message being greater than the maximum size of the payload field of said payload message, the method comprises a step of segmenting the payload set in order to distribute said payload into a series of payload messages whose identifiers are ranked in ascending order so as to allow a receiver to fully reconstruct said series of payload messages. Thus, large messages are segmented in order to respect the restrictions of the link layer.

At least one embodiment of the invention also relates to a computer program product characterized wherein a set of program code instructions which, when run by one or more processors, configure the processor(s) to implement a method as set forth previously.

At least one embodiment of the invention also relates to transmitter user equipment for communicating messages between a plurality of pieces of user equipment of a user equipment set via a communication network, said user equipment being configured to:

broadcast a series of payload messages to at least one other piece of user equipment of the user equipment set, each payload message of said series of payload messages comprising an identifier of said payload message and an identifier of at least one piece of user equipment recipient of said series of payload messages, in the absence of receipt of an acknowledgement message sent by a recipient and after receipt of a status message from said recipient indicating its presence on the communication network, rebroadcast the series of payload messages, or, upon receipt of an acknowledgement message from said recipient not comprising receipt information for each payload message of the series and after receipt of a status message from said recipient indicating its presence on the communication network, rebroadcast each payload message of the series for which no receipt information is comprised in the acknowledgement message received.

In one or more embodiments, the transmitter user equipment is configured to insert the identifier of one or more recipients into each payload message of the series of payload messages.

In at least one embodiment, the transmitter user equipment is configured to, the size of a payload set configured to be inserted into a payload message being greater than the maximum size of the payload field of said payload message, segment the payload set in order to distribute said payload into a series of payload messages whose identifiers are ranked in ascending order in order to allow a receiver to fully reconstruct said series of payload messages.

Advantageously, in one or more embodiments, the transmitter user equipment is configured to broadcast a status message indicating the presence on the communication network of said user equipment.

At least one embodiment of the invention also relates to receiver user equipment for communicating messages between a plurality of pieces of user equipment of a user equipment set via a communication network, said user equipment being configured to:

broadcast a status message indicating the presence of said user equipment on the communication network, receive at least one payload message of a series of payload messages broadcast by a piece of transmitter user equipment of the user equipment set, determine, from a payload message received of a series of payload messages broadcast, its status of recipient or not of the series of payload messages broadcast, when it has determined a status of recipient of a series of payload messages broadcast, send an acknowledgement message to the transmitter, said acknowledgement message comprising receipt information for each payload message of the series received by said receiver.

At least one embodiment of the invention also relates to user equipment configured to be both a transmitter, as set forth previously, and a receiver, as described above.

At least one embodiment of the invention also relates to a communication system comprising a plurality of pieces of user equipment as set forth previously and a communication network, preferably a highly constrained ad hoc network, configured to enable communication between said pieces of user equipment.

BRIEF DESCRIPTION OF THE DRAWINGS

Further characteristics and advantages of one or more embodiments of the invention will further appear upon reading the description that follows. This is purely illustrative and should be read in conjunction with the appended drawings in which.

DETAILED DESCRIPTION OF THE INVENTION

Figure 1:
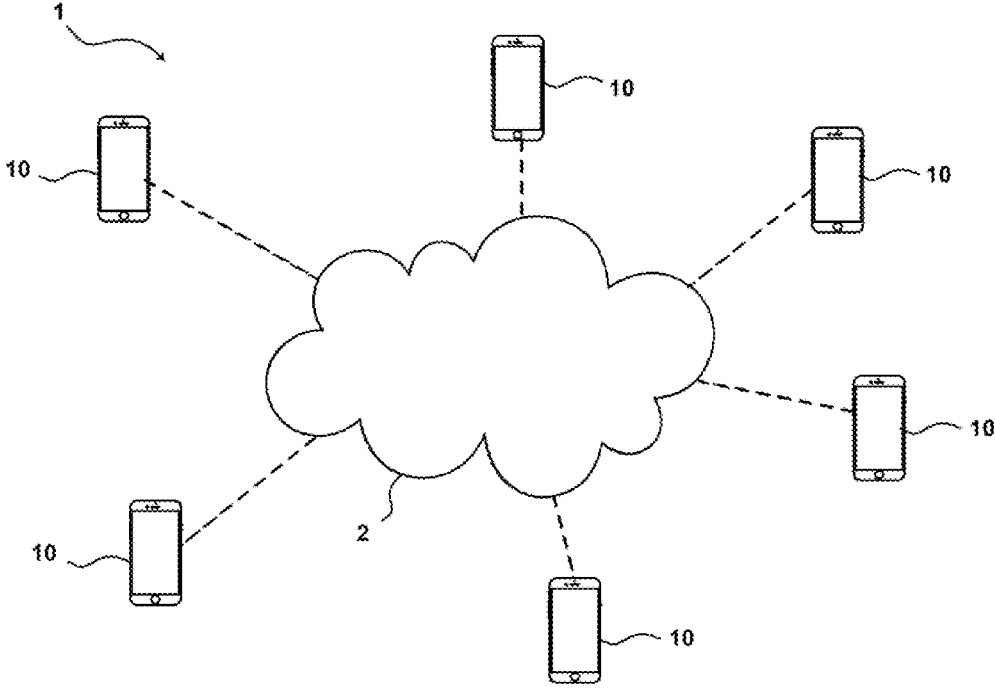
FIG. 1 schematically illustrates the system according to one or more embodiments of the invention.

FIG. 1 illustrates an example of system 1 according to one or more embodiments of the invention.

System 1

The system 1 comprises a user equipment 10 set and a communication network 20.

User Equipment 10

In this example, by way of at least one embodiment, each user equipment 10 is configured to operate in both transmission and reception. Each user equipment 10 is characterized by a unique identifier in the system 1.

Figure 2:
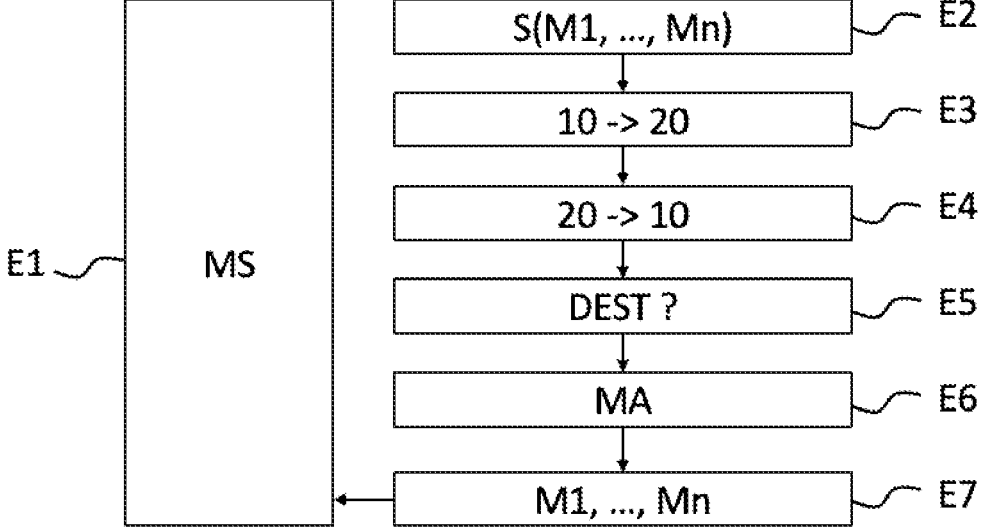
FIG. 2 schematically illustrates the method according to one or more embodiments of the invention.

With reference to FIG. 2, according to one or more embodiments, each user equipment 10 is configured to transmit three types of messages: so-called "status" messages MS, so-called "payload" messages M1, . . . , Mn and acknowledgement messages MA. Each message MS, M1, . . . , Mn, MA comprises data which are coded in a signal transmitted by the transmitter user equipment 10, in a manner known per se. Thus, in at least one embodiment, each user equipment 10 is configured to code the data to be sent in a signal and to send said signal to the pieces of receiver user equipment 10 via the communication network 20. Similarly, in at least one embodiment, each receiver user equipment 10 is configured to receive the signals transmitted by the other pieces of user equipment 10 and to decode said signals in order to determine the messages coded in said signals.

The payload messages M1, . . . , Mn are sent as a series S of messages. Each series S of messages comprises at least one payload message M1, . . . , Mn. Each payload message M1, . . . , Mn of the series S comprises an identifier of said message M1, . . . , Mn, payload intended for one or more of the other pieces of user equipment 10 of the user equipment 10 set, for example the data of an application (or application data), and the identifier(s) of the pieces of user equipment 10 recipients of the series S of payload messages M1, . . . , Mn.

Each user equipment 10 is configured to transmit a series S of payload messages M1, . . . , Mn whenever such payload is to be sent to one, several, or even all the pieces of user equipment 10 of the user equipment 10 set. To this end, each user equipment 10 is configured to insert into each payload message M1, . . . , Mn of the series S, an identifier of said message, and the identifier(s) of the pieces of recipient user equipment 10.

A status message MS comprises the identifier of the user equipment 10 that transmits said status message MS in order to allow the other pieces of user equipment 10 to know that said user equipment 10 transmitter of the status message MS is present on the communication network 20 in order to receive messages. Each user equipment 10 is configured to broadcast, that is periodically transmit, a status message MS when said user equipment 10 is present on the communication network 20.

Each user equipment 10 is configured to determine, from at least one payload message M1, . . . , Mn received, whether said user equipment 10 is a recipient or not of the series of payload messages M1, . . . , Mn transmitted.

Each user equipment 10 recipient of a series S of payload messages M1, . . . , Mn is configured to send an acknowledgement message MA to the transmitter. This acknowledgement message MA comprises receipt information for each message of the series S received by said recipient user equipment 10.

Each transmitter user equipment 10 is configured to, in the absence of receipt of an acknowledgement message MA sent by a recipient DEST and after receipt of a status message MS from said recipient DEST indicating its presence on the communication network 20, rebroadcast the series S of payload messages M1, . . . , Mn.

Each transmitter user equipment 10 is configured to, upon receipt of an acknowledgement message MA from said recipient DEST not comprising receipt information for each payload message M1, . . . , Mn of the series S and after receipt of a status message MS from said recipient DEST indicating its presence on the communication network 20, rebroadcast the payload messages M1, . . . , Mn of the series S for which no receipt information is comprised in the acknowledgement message MA received.

The receipt information for a payload message M1, . . . , Mn is, for example, the identifier of said payload message M1, . . . , Mn.

By way of example, in one or more embodiments, for a series S of payload comprising three payload messages M1, M2, M3 having a single piece of recipient user equipment 10, in the case where the transmitter user equipment 10 of the series S receives a status message MS but no acknowledgement message MA from the recipient, the transmitter rebroadcasts all three payload messages M1, M2, M3 of the series S. In the case where the transmitter user equipment 10 of the series S receives from the recipient a status message MS and an acknowledgement message MA comprising the identifier of the first message M1 and the identifier of the third message M3, the transmitter rebroadcasts the second message M2 only.

Each user equipment 10 comprises a processor capable of implementing a set of instructions enabling these functions to be performed.

Example of Implementation

An example of the method according to one or more embodiments of the invention will now be described with reference to FIG. 2.

Permanently, in a step E1, each user equipment 10 of the user equipment 10 set broadcasts a status message MS indicating its presence on the communication network 20. In practice, such a broadcast results in a periodic transmission of the status message MS, the content of the latter comprising at least the identifier of the user equipment 10 that transmits it.

When one of the pieces of user equipment 10 needs to transmit a series S of payload messages M1, . . . , Mn, for example related to an application, to one or more of the other pieces of user equipment 10 of the user equipment 10 set, or even to all the other pieces of user equipment 10 of the user equipment 10 set, said user equipment 10, referred to as "transmitter", generates the series S of payload messages M1, . . . , Mn to be sent in a step E2. This step E2 comprises, if necessary, segmenting the payload set to be sent into several subsets, each subset being sent in a payload message M1, . . . , Mn of the series S in the order of segmentation of the payload set. Step E2 then comprises inserting each subset into a different payload message M1, . . . , Mn of the series S, assigning an identifier to each payload message M1, . . . , Mn, and inserting the identifier of the recipient(s) DEST of the series S.

The transmitter user equipment 10 broadcasts each payload message M1, . . . , Mn of the series S, in turn in the order of said series S, via the communication network 20 in a step E3. The payload messages M1, . . . , Mn of the series S may be broadcast as they are generated, one by one or the series S may first be generated and then broadcast in a burst, preferably in the order of the payload messages M1, . . . , Mn of the series S.

The payload messages M1, . . . , Mn sent by the transmitter user equipment 10 are received by some or all the other pieces of so-called "receiver" user equipment 10, in a step E4. All or part of the payload messages M1, . . . , Mn sent by the transmitter user equipment 10 may not be received by some or all the pieces of receiver user equipment 10.

Upon receipt of a payload message M1, . . . , Mn by a receiver user equipment 10, the receiver user equipment 10 analyses the payload message M1, . . . , Mn in order to determine the recipient DEST identifier(s) corresponding to its own identifier (that is, its unique identifier with which it indicates that it is connected to the communication network 20 in its status messages MS) in a step E5. In the absence of a recipient DEST identifier in the received message, the receiver deduces therefrom that the received message is intended for all the pieces of user equipment 10 of the user equipment 10 set.

Next, in at least one embodiment, for each receiver having determined a status of recipient DEST of the series S of payload messages M1, . . . , Mn sent, said receiver sends in a step E6 an acknowledgement message MA, comprising receipt information for each payload message of the series received by said receiver, to the transmitter via the communication network 20.

Next, by way of one or more embodiments, in a step E7, in the absence of receipt of an acknowledgement message MA sent by a recipient DEST and after receipt of a status message MS from said recipient DEST indicating its presence on the communication network 20, the transmitter rebroadcasts the series of payload messages M1, . . . , Mn, or, upon receipt of an acknowledgement message MA from said recipient DEST not comprising receipt information for each payload message M1, . . . , Mn of the series S and after receiving a status message MS from said recipient DEST indicating its presence on the communication network 20, the transmitter rebroadcasts the payload messages M1, . . . , Mn of the series S for which no receipt information is comprised in the acknowledgement message MA received by said recipient DEST.

It should be noted that several transmitters may send payload messages M1, . . . , Mn simultaneously and that one transmitter may thus also be a receiver of payload messages M1, . . . , Mn sent by another transmitter of the user equipment 10 set, according to one or more embodiments of the invention.

At least one embodiment of the invention makes it possible to ensure that all the payload messages M1, . . . , Mn of a series S of payload messages M1, . . . , Mn sent by a transmitter is actually received by the recipient(s) of said series S of payload messages M1, . . . , Mn.

The invention claimed is:

1. A method for communicating messages between a plurality of pieces of user equipment of a user equipment set via a communication network, said method comprising:

broadcasting by each user equipment of the plurality of pieces of user equipment of the user equipment set, a status message indicating a presence of said each user equipment on the communication network, broadcasting, by a first piece of the plurality of pieces of user equipment of the user equipment set, a series of payload messages to at least one other piece of user equipment of the plurality of pieces of user equipment of the user equipment set, wherein said first piece comprises a transmitter, wherein each payload message of said series of payload messages comprises an identifier of said each payload message of said series of payload messages, and at least one identifier of a user equipment recipient of said series of payload messages, receiving, by at least one second piece of the plurality of pieces of user equipment of the user equipment set, at least one payload message of the series of payload messages that is broadcast by the transmitter, wherein said at least one second piece comprises a receiver, for each receiver of said at least one second piece, determining from the at least one payload message that is received, its status of recipient or not of the series of payload messages that are broadcasted, for said each receiver that determines a status of recipient of the series of payload messages that are broadcasted, sending by said each receiver an acknowledgement message to the transmitter, wherein said acknowledgement message comprises receipt information for said each payload message of the series received by said receiver, in an absence of receipt of the acknowledgement message that is sent by a recipient and after receipt of a status message from said recipient indicating its presence on the communication network, rebroadcasting by the transmitter the series of payload messages, or, upon receipt of the acknowledgement message from said recipient not comprising said receipt information for said each payload message of the series of payload messages and after receipt of said status message from said recipient indicating its presence on the communication network, rebroadcasting by the transmitter said each payload message of the series of payload messages for which no receipt information is comprised in the acknowledgement message received by said recipient.

2. The method according to claim 1, wherein the receipt information for said each payload message is the identifier of said each payload message.

3. The method according to claim 1, wherein a size of a payload set configured to be inserted into a payload message of said series of payload messages is greater than a maximum size of a payload field of said payload message, and further comprising segmenting the payload set in order to distribute payload into said series of payload messages whose identifiers are ranked in ascending order to allow said receiver to fully reconstruct said series of payload messages.

4. A non-transitory computer program product comprising a set of program code instructions which, when run by one or more processors, configure the one or more processors to implement a method for communicating messages between a plurality of pieces of user equipment of a user equipment set via a communication network, said method comprising;

broadcasting by each user equipment of the plurality of pieces of user equipment of the user equipment set, a status message indicating a presence of said each user equipment on the communication network, broadcasting, by a first piece of the plurality of pieces of user equipment of the user equipment set, a series of payload messages to at least one other piece of user equipment of the plurality of pieces of user equipment of the user equipment set, wherein said first piece comprises a transmitter, wherein each payload message of said series of payload messages comprises an identifier of said each payload message of said series of payload messages, and at least one identifier of a user equipment recipient of said series of payload messages, receiving, by at least one second piece of the plurality of pieces of user equipment of the user equipment set, at least one payload message of the series of payload messages that is broadcast by the transmitter, wherein said at least one second piece comprises a receiver, for each receiver of said at least one second piece, determining from the at least one payload message that is received, its status of recipient or not of the series of payload messages that are broadcasted, for said each receiver that determines a status of recipient of the series of payload messages that are broadcasted, sending by said each receiver an acknowledgement message to the transmitter, wherein said acknowledgement message comprises receipt information for said each payload message of the series received by said receiver, in an absence of receipt of the acknowledgement message that is sent by a recipient and after receipt of a status message from said recipient indicating its presence on the communication network, rebroadcasting by the transmitter the series of payload messages, or, upon receipt of the acknowledgement message from said recipient not comprising said receipt information for said each payload message of the series of payload messages and after receipt of said status message from said recipient indicating its presence on the communication network, rebroadcasting by the transmitter said each payload message of the series of payload messages for which no receipt information is comprised in the acknowledgement message received by said recipient.

5. A user equipment that communicates messages between a plurality of pieces of user equipment of a user equipment set via a communication network, said user equipment comprising:

a transmitter, wherein said transmitter is configured to broadcast a series of payload messages to at least one other piece of user equipment of other pieces of user equipment of the plurality of pieces of user equipment of the user equipment set, wherein each payload message of said series of payload messages comprises an identifier of said each payload message and an identifier of a recipient of said series of payload messages of said at least one other piece of user equipment recipient, in an absence of receipt of an acknowledgement message sent by said recipient and after receipt of a status message from said recipient indicating its presence on the communication network, rebroadcast the series of payload messages, or, upon receipt of said acknowledgement message from said recipient not comprising receipt information for said each payload message of the series of payload messages and after receipt of said status message from said recipient indicating its presence on the communication network, rebroadcast said each payload message of the series of payload messages for which no receipt information is comprised in the acknowledgement message received by said recipient.

6. The user equipment according to claim 5, wherein said transmitter is further configured to, when a size of a payload set configured to be inserted into a payload message is greater than a maximum size of a payload field of said payload message, segment the payload set in order to distribute payload into said series of payload messages whose identifiers are ranked in ascending order to allow a receiver to fully reconstruct said series of payload messages.

7. The user equipment according to claim 5, wherein said transmitter is further configured to insert the identifier of one or more recipients into said each payload message of the series of payload messages.

8. The user equipment according to claim 5, wherein said transmitter is further configured to broadcast said status message indicating its presence on the communication network of said user equipment.

9. The user equipment according to claim 5, wherein said user equipment further comprises a receiver, wherein said receiver is configured to broadcast a status message indicating a connection to the communication network of said user equipment, receive at least one payload message of said series of payload messages that are broadcasted by said transmitter of the user equipment set, determine, from a payload message received, status of recipient or not of said series of payload messages that are broadcasted, when said receiver has determined said status of recipient of said series of payload messages that are broadcasted, send said acknowledgement message to the transmitter of the series of payload messages, wherein said acknowledgement message comprises receipt information for said each payload message of the series of payload messages that are received by said receiver.

10. The user equipment according to claim 5, further comprising said communication network, wherein said communication network is configured to enable communication between said plurality of pieces of user equipment.

* * * * *